UNITED STATES PATENT OFFICE.

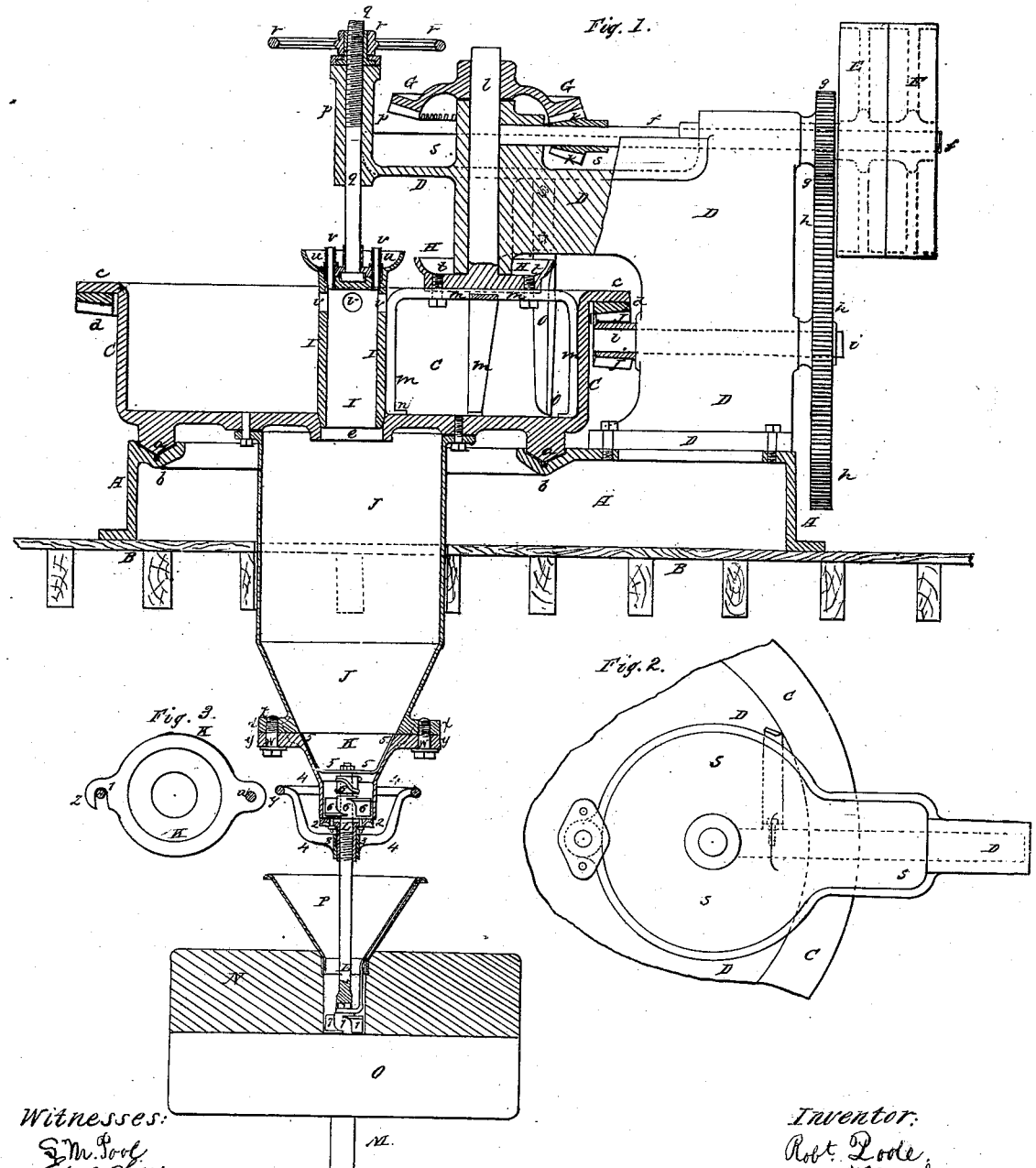

ROBERT POOLE, OF BALTIMORE, MARYLAND.

*Letters Patent No. 85,762, dated January 12, 1869.*

IMPROVED MACHINE FOR MIXING PAINTS AND CHEMICALS.

The Schedule referred to in these Letters Patent and making part of the same.

*To all whom it may concern:*

Be it known that I, ROBERT POOLE, of the city of Baltimore, and State of Maryland, have invented certain new and useful Improvements in Machines for Mixing or Rubbing Paints, Chemicals, and other substances; and I do hereby declare the following to be a full, clear, and exact description of the same, reference being had to the accompanying drawings, making a part of this specification, in which—

Figure 1 represents a sectional elevation of the main portions of the machine, some portions being in full.

Figure 2 represents a top plan of portion of the machine.

Figure 3 represents a top plan of a portion of the apparatus, that will be more specially referred to hereafter.

The machine which is the subject of my invention has for its object, mainly, the mixing of paints and chemicals, but may be used for mixing or rubbing any soft, pasty, gummy, glutinous, or resinous substances; and My invention consists in several of the details of the machine to make it available for the above-named purpose, which I mention as follows:

First, a ventilating plug, for allowing the mixed material to pass from the receiver, and if heated by the mixing or rubbing, to allow the heat to pass off.

Second, to a revolving receiver, attached to and revolving with the pan in which the material is mixed.

Third, to a stirring and feeding-arrangement, in connection with a valve, screw, and agitator, to regulate the passage of the mixed material from the receiver.

Fourth, to a detachable nozzle, in connection with the feeding-apparatus, for facilitating the cleansing of the apparatus therefor.

Fifth, to the drip-cups, for preventing any of the oil of the machinery from getting into the material that is being mixed, and thus staining or damaging it.

To enable others skilled in the art to make and use my invention, I will proceed to describe the same with reference to the drawings.

The base or bed A of the machine may rest upon the floor B of an upper room, in which the mixing-apparatus is arranged and works, and the receiver and conveyer may extend through said floor, so as to convey it into a room below, where it is afterwards treated or packed.

On the bed or base A is supported a pan, basin, or other suitable vessel, C, for containing the material to be mixed or rubbed.

This pan C has a flange, $a$, on its under side, which is supported and moves in a circular recess, $b$, in the bed, said recess being so made as to contain a lubricating-material for allowing the flange on the pan to run freely therein, and without undue friction.

On the upper part of the pan C there is a flange, $c$, on the under part of which is formed a cogged gear, $d$, by which it is revolved.

In the centre of the pan there is an opening, $e$, which is closed by a plug, when material is being mixed or rubbed in it, and which is withdrawn, as will be hereafter explained, when the pan is to be emptied of its contents.

On the bed or base A there is secured a pillar-block or bracket-block, D, which contains bearings or supports for the gears and their shafts, as also for some of the appliances hereafter to be mentioned.

The main driving-shaft, $f$, has upon it a fast and loose pulley, E F, for holding the driving-belt, and through which it is driven or stopped, as the case may be.

On the shaft $f$ there is a gear, $g$, which meshes into and drives a gear, $h$, on a shaft, $i$, and, consequently, the shaft too, as its gear is fast on it.

On the inner end of the shaft $i$ there is a bevel-gear, $j$, which works in the circular gear, $d$, on the pan, and revolves said pan.

On the upper or main driving-shaft $f$ there is a bevel-pinion, $k$, that works into and turns the bevel-gear G, which is secured to the upper end of a vertical shaft, $l$. The lower end of said shaft $l$ carries a drip-cup, H, to the under side of which are secured the stirrers or mixers, $m$ $m$ $m$, which extend down into the pan, the lower ends of these mixers being bent or turned, as shown at $n$, and run close to the bottom of the pan.

A scraper, $o$, is attached to the block D, and extends down into the pan, and in close proximity to its inner perimeter, to scrape off the material that might adhere thereto, and bring it within the influence of the mixers $m$, which rotate close to it.

Through a vertical support, $p$, on the end of the block or gear-frame, D, there passes a screw-rod, $q$, that has a nut and hand-wheel, $r$, working in connection with it, so as to raise it up or let it down; and to the lower end of this screw-rod $q$ is attached a hollow plug, I, which closes or discloses the hole $e$ through bottom of the pan, as the case may be.

The shafts $f$ $i$ $l$ $q$ of course require boxes or bearings to move in, and must have such bearings oiled. The oil from the shaft $i$, it being outside of and below the top of the pan, could not drip and drop into the pan, as could that from the other shafts $f$ $l$ $q$, and to prevent this dripping or dropping of the oil, which, if allowed to drop into white lead, so stains it as to injure its commercial value, I arrange drip-cups $s$ H $u$, under these shafts, that will catch and hold all such drippings, and from which it may readily be taken.

The plug I is hollow, as before mentioned, and is furnished with openings $v$ at or near its top, or above the line of the material that is being treated in the pan, so as to allow ventilation from the receiver below the pan, which I will now describe.

The receiver J is attached to and revolves with the pan C, and when the plug I is raised up, the contents of the pan pass into the receiver J, which should be of capacity enough to hold one or more charges.

The lower end of the receiver is of a funnel-form, and the section K, at its extreme end, is removable, so as to get at the interior to cleanse it.

The section K is connected to the receiver by a screw-bolt, $w$, passing through the lugs or flanges $x\,y$, and by an open hook, $z$, and screw-bolt, 1, as seen in figs. 1 and 3, which admit of its being easily freed and swung to one side, without being actually taken off.

The lower end of the receiver is controlled by a valve, 2, which can be moved by a screw-nut, 3, working in a screw cut in the spindle L, said nut being turned by a hand-wheel, 4, connected to the nut. By turning the hand-wheel, the valve can be moved to open, close, or regulate the outlet of the material from the receiver, or stop it, at pleasure.

The spindle L is revolved by the spindle M, which turns the runner of the pair of grinding, rubbing, or mixing-"stones" N O, which "stones," as they are termed, may be of any of the usual well-known material used for such purpose.

The spindle L extends up into the receiver, and has upon its upper end a stirrer, 5, which, in revolving with the spindle, prevents the material from arching and clogging in the receiver; and below this stirrer, or at the bottom of the receiver, and close to the valve, there is a forced screw or other feed, 6, which forces the material out of the receiver, whence it drops into the hopper P, and by a somewhat similar screw-feed, 7, therein, is forced into or through the eye of the upper stone, and introduced to the grinding-surface between the stones.

The ventilating-holes $v$ in the plug I prevent a vacuum from creating in the receiver, and also allow any vapors or gases to pass off.

As the stones may and do run independent of the revolving of the pan, the feeding will continue, notwithstanding the pan and receiver may stop, for recharging the pan, or discharging it. Of course, when both the receiver and the screw-feed are revolving, the feed will be greater than when the feed alone is in motion, but the valve and its regulation are so ready as to compensate at once for the change of feed.

Having thus fully described my invention,

What I claim therein as new, and desire to secure by Letters Patent, is—

1. In combination with the revolving pan, a hollow or ventilating-plug, I, substantially as and for the purpose described.

2. Also, in combination with a revolving pan, a receiver, attached to or revolving with it, substantially as and for the purpose described.

3. Also, in combination with the receiver, the stirrer, forced feed, and valve-regulator, for insuring and regulating the feed, whether the receiver and feed are both in motion, or only one of them, substantially as described.

4. Also, in combination with the receiver, the detachable nozzle or section K, for the purpose of gaining ready access to the interior, for cleansing or repairs, substantially as described.

5. Also, in combination with the shafts or bearings that require lubrication, and are over or within the pan, the arrangement of the drip-cups, to prevent any oil or drippings from falling into the material that is being mixed, substantially as described.

ROBT. POOLE.

Witnesses:
A. B. STOUGHTON,
GEORGE POOLE.